United States Patent
Avireddi et al.

(10) Patent No.: US 10,259,468 B2
(45) Date of Patent: Apr. 16, 2019

(54) ACTIVE VEHICLE PERFORMANCE TUNING BASED ON DRIVER BEHAVIOR

(71) Applicant: HITACHI, LTD., Tokyo (JP)

(72) Inventors: Prashanth Avireddi, Farmington, MI (US); Heming Chen, Novi, MI (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/624,631

(22) Filed: Jun. 15, 2017

(65) Prior Publication Data

US 2018/0362049 A1    Dec. 20, 2018

(51) Int. Cl.
| | | |
|---|---|---|
| *B60W 50/08* | (2012.01) | |
| *B60W 40/09* | (2012.01) | |
| *B60W 30/182* | (2012.01) | |
| *G06F 16/435* | (2019.01) | |
| *B60W 50/00* | (2006.01) | |

(52) U.S. Cl.
CPC .......... *B60W 40/09* (2013.01); *B60W 30/182* (2013.01); *B60W 50/0097* (2013.01); *G06F 16/437* (2019.01); *B60W 2050/0079* (2013.01); *B60W 2050/0088* (2013.01); *B60W 2050/0089* (2013.01); *B60W 2520/105* (2013.01); *B60W 2530/14* (2013.01); *B60W 2540/10* (2013.01); *B60W 2540/12* (2013.01); *B60W 2540/16* (2013.01); *B60W 2540/18* (2013.01); *B60W 2540/28* (2013.01); *B60W 2540/30* (2013.01); *B60W 2550/20* (2013.01); *B60W 2550/402* (2013.01); *B60W 2550/404* (2013.01);

(Continued)

(58) Field of Classification Search
None
See application file for complete search history.

(56) References Cited

U.S. PATENT DOCUMENTS

| | | | | | |
|---|---|---|---|---|---|
| 5,620,393 | A | * | 4/1997 | Minowa ............... | B60K 28/165 477/155 |
| 6,155,385 | A | * | 12/2000 | Basnett .................. | B60T 7/042 188/196 V |

(Continued)

FOREIGN PATENT DOCUMENTS

| | | |
|---|---|---|
| EP | 1302356 A1 | 4/2003 |
| JP | 2016-216021 A | 12/2016 |

OTHER PUBLICATIONS

European Search Report for related EP Patent Application No. 18153778.8, dated Jul. 19, 2018; 10 pages.

(Continued)

*Primary Examiner* — Brent Swarthout
(74) *Attorney, Agent, or Firm* — Procopio, Cory, Hargreaves & Savitch LLP (57) ABSTRACT

The driver's driving behavior will be recorded and a signature will be created either on vehicle or on a cloud data center. The driver signature can be accessed using secure authentication by any vehicle he will be driving. The data collection is a continuous process monitoring driving behavior of the driver. The guidelines from OEM are used to compare driver signature with ideal driving characteristics. Changes are pushed to the vehicle controller to modify controls of individual automotive components to adjust the efficiency of vehicle and improve the ride comfort for the driver. The changes to be made can be decided on a remote cloud system or on the vehicle.

16 Claims, 7 Drawing Sheets

(52) U.S. Cl.
CPC ..... *B60W 2710/06* (2013.01); *B60W 2710/10* (2013.01); *B60W 2710/22* (2013.01)

(56) References Cited

U.S. PATENT DOCUMENTS

| | | | |
|---|---|---|---|
| 6,216,068 B1 * | 4/2001 | Gimmler | B60W 10/06 |
| | | | 701/36 |
| 6,306,063 B1 | 10/2001 | Horgan et al. | |
| 7,389,178 B2 | 6/2008 | Raz et al. | |
| 8,195,364 B2 | 6/2012 | Norris et al. | |
| 8,483,904 B2 | 7/2013 | Viggers | |
| 9,174,652 B2 | 11/2015 | Chang | |
| 2005/0131597 A1 | 6/2005 | Raz et al. | |
| 2008/0255722 A1 | 10/2008 | McClellan et al. | |
| 2008/0319602 A1 | 12/2008 | McClellan et al. | |
| 2010/0023197 A1 | 1/2010 | Huang et al. | |
| 2013/0311041 A1 | 11/2013 | Lynar et al. | |
| 2014/0195213 A1 * | 7/2014 | Kozloski | G06F 17/5009 |
| | | | 703/8 |
| 2015/0149017 A1 | 5/2015 | Attard et al. | |
| 2016/0026182 A1 | 1/2016 | Boroditsky et al. | |
| 2017/0267252 A1 * | 9/2017 | Park | B60W 30/12 |
| 2017/0297586 A1 * | 10/2017 | Li | G05D 1/0088 |

OTHER PUBLICATIONS

Office Action for related Japanese Patent Application No. 2018-025888, dated Oct. 30, 2018; 3 pages.

* cited by examiner

| User ID | GPS data | Accelerometer Data | Vehicle Input Data | Traffic Data | Gyroscope Data | ... |
|---|---|---|---|---|---|---|
| U1 | G1 | A1 | V1 | T1 | G1 | ... |
| U2 | G2 | A2 | V2 | T2 | G2 | ... |
| U3 | G3 | A3 | V3 | T3 | G3 | ... |
| U4 | G4 | A4 | V4 | T4 | G4 | ... |
| ... | ... | ... | ... | ... | ... | ... |

FIG. 3(a)

| User ID | Driver Signature |
|---|---|
| U1 | D1 |
| U2 | D2 |
| U3 | D3 |
| U4 | D4 |
| ... | ... |

ACTIVE VEHICLE PERFORMANCE TUNING BASED ON DRIVER BEHAVIOR

BACKGROUND

Field

The present disclosure relates generally to automotive systems, and more specifically, to autonomous driving and assisted driving systems.

Related Art

In related art implementations, there are systems that are directed to the increasing of safety and driver detachment during the operation of an automobile. In related art implementations, there is a significant push towards advanced driver assisted systems (ADAS), fleet systems and ride sharing.

In related art fleet or ride sharing programs, when a driver utilizes different vehicles, the efficiency of the vehicle that is being used varies significantly. The driving behavior of the driver and the vehicle dynamics are not correlated to increase or at least maintain similar efficiency and ride feeling across the fleet.

SUMMARY

Example implementations are directed to understanding and replicating driver behavior. The idea of replicating the driver behavior is to keep the driver performance consistent over different road/ambient conditions, and tune or adjust the automobile/components according to the expected response of the driver to function at higher efficiency. The mathematical representation of a driver behavior is described as a driver signature. The driver signature can be ported to a different vehicle with the driver to ensure consistent performance of the driver. For autonomous cars, the driver signature can further be utilized to teach the cars to drive like respective drivers to add familiarity to the autonomous systems. The example implementations are directed to adding value to the autonomous and assisted driving systems.

Aspects of the present disclosure include a vehicle, which can involve a processor, configured to determine a driver signature for a vehicle, the driver signature configured to predict upcoming driver actions made to the vehicle; and while the vehicle is in operation, control functionality of the vehicle in anticipation to the upcoming driver actions predicted from the driver signature.

Additional aspects of the present disclosure include an apparatus, communicatively coupled to one or more vehicles, the apparatus including a processor, configured to process sensor data from each of the one or more vehicles; determine a driver signature for a vehicle from the one or more vehicles, the driver signature configured to predict upcoming driver actions made to the vehicle from the one or more vehicles; and while the vehicle is in operation, provide the driver signature for the vehicle from the one or more vehicles.

Additional example implementations can include a system, which can involve one or more vehicles configured to provide sensor data; and an apparatus, communicatively coupled to one or more vehicles, the apparatus involving a processor, configured to process sensor data from each of the one or more vehicles; determine a driver signature for a vehicle from the one or more vehicles, the driver signature configured to predict upcoming driver actions made to the vehicle from the one or more vehicles; and while the vehicle is in operation, provide the driver signature to the vehicle from the one or more vehicles.

Aspects of the present disclosure include a computer program, storing instructions for executing a process, the instructions configured to determine a driver signature for a vehicle, the driver signature configured to predict upcoming driver actions made to the vehicle; and while the vehicle is in operation, control functionality of the vehicle in anticipation to the upcoming driver actions predicted from the driver signature. Such instructions may be stored on a non-transitory computer readable medium configured to be executed by one or more processors.

Aspects of the present disclosure include a method which includes determining a driver signature for a vehicle, the driver signature configured to predict upcoming driver actions made to the vehicle; and while the vehicle is in operation, controlling functionality of the vehicle in anticipation to the upcoming driver actions predicted from the driver signature.

Additional example implementations can include a system, which can involve one or more vehicles configured to provide sensor data; means for processing sensor data from each of the one or more vehicles; means for determining a driver signature for a vehicle from the one or more vehicles, the driver signature configured to predict upcoming driver actions made to the vehicle from the one or more vehicles; and while the vehicle is in operation, means for providing the driver signature to the vehicle from the one or more vehicles.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Although there is significant related art development in the area of ADAS, there is a lack of related art implementations for algorithms that incorporate driver profile into efficiency determination for the vehicle based.

Example implementations described herein use the driving behavior of the driver to generate a driver signature which can be stored either in the cloud or the car. The driver signature is then correlated with the characteristics of the vehicle that will be utilized. Based on Original Equipment Manufacturer (OEM) guidelines for extracting maximum efficiency from the vehicle, changes will be pushed to the controller for altering control mechanisms of components in the vehicle.

Example implementations are directed to identifying types of driver behavior, so that functions can be constructed to predict how a driver would drive given present circumstances. Through the use of several sensors which are onboard of the car as well as data such as GPS or traffic information of the vehicle and the camera information, example implementations can define the behavior of the driver. Thus, a function can be generated through machine learning so that actions of the driver can be predicted given the circumstances, such as how would the driver push the gas pedal, how would the driver hit the brake pedal, how would the driver turn the steering wheel, and how the driver enters through turns, the probability the driver would speed in a certain circumstances, and so on depending on the desired implementation.

In the related art, there has been a significant push towards the realization of autonomous cars. The focus has been primarily on developing cars which can transport humans/drivers from point A to point B with minimum or no intervention. Almost all of the automotive companies have been investing in technology to build reliable, safe, comfortable and autonomous vehicles.

Between the fully autonomous cars and current vehicles which require full attention of the driver, no significant development has been achieved in tuning the automobile or related components with respect to driver behavior. For example, the engine in a vehicle has constant maps regardless of the driver, which can lead to fuel inefficient systems. Additionally, the shock absorber is tuned to a single driver and fixed parameters, and is not tuned specifically for individual driver comfort.

In an ideal situation, the vehicle is tuned in anticipation of the driver actions to provide utmost comfort and efficiency for the driver. Thus, in example implementations described herein, to anticipate the driver actions, a driver signature is generated from historical data of the driver for all urban settings. The driver signature encapsulates the possible actions of the driver for an upcoming trip. For example, the driver signature can be configured to predict if the driver is going to turn by observing a set of driver actions, and thereby prepares the car for a left or right turn. The driver signature can facilitate the controller to stiffen the shock absorber so that the driver does not experience severe roll. In the above set of events, prediction and controlling the automotive component can ensure that the driver has a comfortable ride.

In example implementations, there are three phases to the development or realization of such technology, which include data collection, machine learning/driver signature, and controlling the automotive components.

Figure 1:
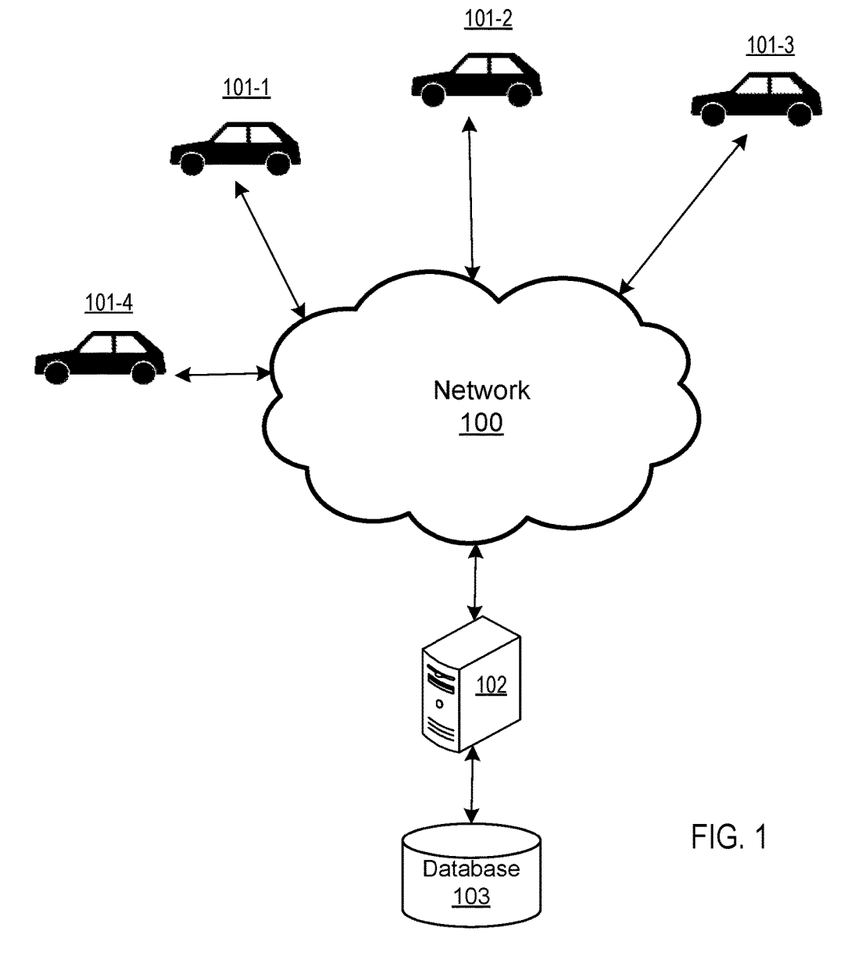
FIG. 1 illustrates a system involving one or more vehicles and a management apparatus, in accordance with an example implementation.

FIG. 1 illustrates a system involving one or more vehicles and a management apparatus, in accordance with an example implementation. One or more vehicles or vehicle systems such as on board diagnostics (OBD) 101-1, 101-2, 101-3, and 101-4 are communicatively coupled to a network 100 which is connected to a management apparatus 102. The management apparatus 102 manages a database 103, which contains data feedback aggregated from the vehicles and vehicle systems in the network 100. In example implementations, the data feedback from the vehicle and vehicle systems 101-1, 101-2, 101-3, and 101-4 can be aggregated to a central repository or central database such as proprietary databases that aggregate data from vehicle or vehicle systems such as enterprise resource planning systems or cloud storage systems, and the management apparatus 102 can access or retrieve the data from the central repository or central database.

Figure 2:
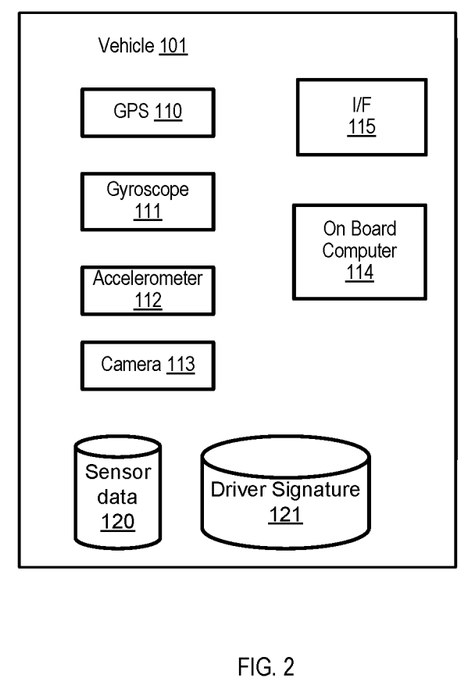
FIG. 2 illustrates an example vehicle system, in accordance with an example implementation.

FIG. 2 illustrates an example vehicle system 101, in accordance with an example implementation. Vehicle system 101 can involve Global Positioning Satellite (GPS) 110, Gyroscope 111, Accelerometer 112, one or more cameras 113, and a network interface (I/F) 115 that is configured to facilitate communications within the vehicle via on board diagnostic (OBD) interface or car area network (CAN) interface, as well as communicate with a cloud or management apparatus 102 via wireless or other methods depending on the desired implementation. Vehicle system 101 may also include on board computer (OBC) 114 configured to manage the functions of the vehicle system 101 as well as execute example implementations described herein based on the desired implementation. Vehicle system 101 may also be configured to store sensor data 120 and a driver signature 121.

In example implementations, the driving behavior of the driver can be recorded and a driver signature 121 can be created either on a vehicle 101 or on a cloud data center 102. The driver signature can be accessed through utilizing secure authentication by any vehicle the driver utilizes. The data collection involves a continuous process for monitoring driver behavior.

Data Collection

In example implementations, the data 120 is collected from the automobile on three different levels: OBD level data, Component Specific Data, and Diagnostics Data. The data 120 can be captured by using the OBD2 or the CAN interface. Apart from the car data, there can also be additional data that is stored and utilized to understanding the surroundings of the driver which can include data collection related to the traffic flow, the local dynamic map (e.g., distance and speed of surrounding cars) and road information, depending on the desired implementation. The surrounding data will be absorbed from GPS 110, camera 113, accelerometer 112 and gyroscope 111.

In example implementations, the data 120 can be stored intermediately on the vehicle, and for long-term storage can be moved to a cloud server/database 103 as illustrated in FIG. 1. The data 120 is processed on the car for generating the driver signature 121, which is then transferred to a central database 103 where the data can be used for other applications such as factory, traceability, and predictive maintenance.

Figure 3A:
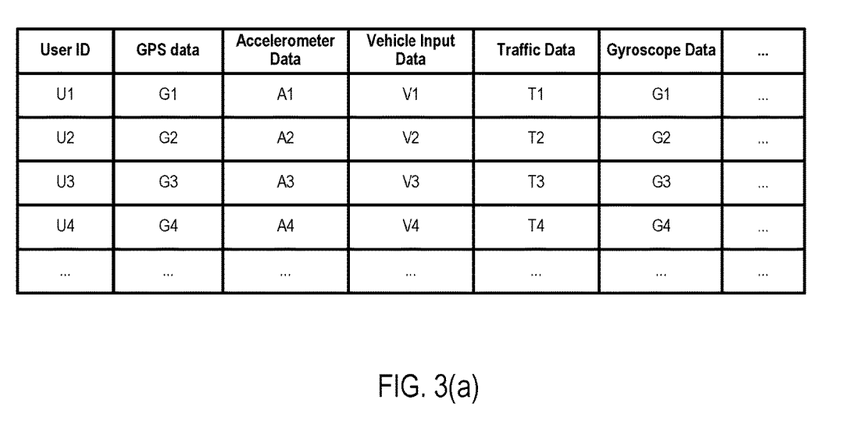
FIGS. 3(a) and 3(b) illustrate example management information, in accordance with an example implementation.
Figure 3B:
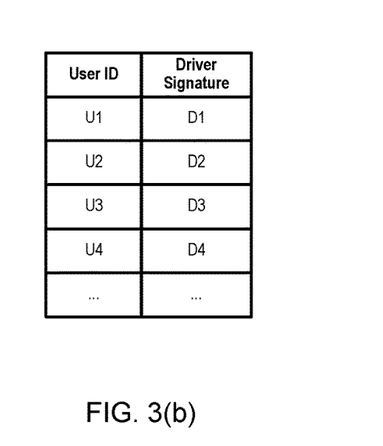

FIGS. 3(*a*) and 3(*b*) illustrate example management information, in accordance with an example implementation. Specifically, FIG. 3(*a*) illustrates example management information that can be stored by vehicle system 101 and/or database 103 from data collection as described above. Such data can include, but is not limited to, User identifier (ID) of the user associated with the trip or vehicle, GPS data, Accelerometer data, Vehicle Input data (e.g., stick shift, brake pedal level, gas pedal level, steering wheel position, and so on), traffic data regarding vehicles, traffic lights and so on around the vehicle, gyroscope data and so on, depending on the desired implementation. Such information can be stored on database 103 as obtained from sensor data 120 from each vehicle system 101 managed by the management apparatus 102. Further, the vehicle system 101 may maintain such data as sensor data 120 to record the history of the vehicle data and the users that utilized the vehicle system 101.

FIG. 3(b) illustrates management information associating user IDs with corresponding driver signatures. The driver signatures are determined for each user ID based on the application of machine learning processes to the associated management information of the user ID from FIG. 3(a) as described below.

Machine Learning

Example implementations are directed to the utilization of machine learning based algorithms. In the related art, a wide range of machine learning based algorithms have been applied to image or pattern recognition, such as the recognition of obstacles or traffic signs of other cars, or the categorization of elements based on a specific training. In view of the advancement in power computations, example implementations can utilize machine learning towards modeling aspects of driving behavior.

Figure 4:
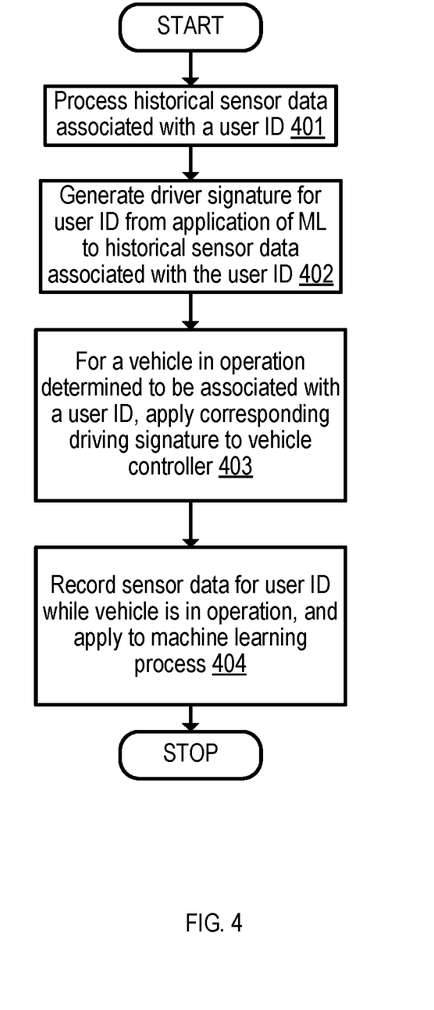
FIG. 4 illustrates an example flow diagram for applying the machine learning process in accordance with an example implementation.

FIG. 4 illustrates an example flow diagram for applying the machine learning process in accordance with an example implementation. In example implementations, machine learning is applied to learn the driver behavior to generate a driver signature 121 which can replicate the predicted actions of the driver in view of input parameters regarding the environment of the vehicle system 101. Example implementations utilize machine learning model that encapsulates the driver performance for all driving settings. The flow of FIG. 4 can be implemented in the vehicle system 101, in the management apparatus 102, or functionality as described in FIG. 4 can be divided between both systems in accordance with the desired implementation.

At 401, the flow processes historical sensor data associated with a user ID. The historical data can involve data stored in the database 103 and/or sensor data 120. Depending on the desired implementation, the user ID can be determined from having the user login to the vehicle system 101, and/or can be derived based on detection of the user based on the driving patterns derived from sensor data 120 when compared to driver signatures 121 stored in the vehicle system 101 or as stored in the database 103.

At 402, the flow generates the driver signature for user ID from application of machine learning to historical sensor data associated with the user ID. Depending on the desired implementation, the driver signature 121 can be optimized for one or more of fuel economy, safety and vehicle comfort based on the historical sensor data associated with the user ID. The driver signature is thereby configured to predict the upcoming actions of the driver associated with the user ID based on real time sensor data obtained in sensor data 120, and adjust the functionality of the vehicle 101 based on the predicted actions. The scenarios where driver behavior is utilized can include predicting the acceleration from a stop, the deceleration to a stop, whether a driver will take a turn, whether a driver will make rapid acceleration during cruising, and so on depending on the desired implementation. The above scenarios will help the vehicle controller or onboard computer 114 to optimize the automotive component for the driver. Aspects of the vehicle that are controlled based on the output of the driver signature 121 are described with respect to FIGS. 5(a) and 5(b).

At 403, for a given vehicle that is in operation, the flow determines the user ID associated with the vehicle that is in operation and applies the corresponding driver signature 121 to the vehicle 101. The user ID can be determined based on input provided by the user to the vehicle system 101 (e.g., via user login, via device associated with user, etc.) and the driver signature 121 can be determined accordingly. Further, if such information is not available, the user ID can be determined based on the driving behavior detected by the sensors as stored in sensor data 120, wherein the data can be matched to the stored driving signatures to select the corresponding driving signature 121.

At 404, while the vehicle is in operation, sensor data 120 is recorded and provided to the driver signature 121 to predict upcoming driving actions, wherein the functionality of the vehicle system 101 is changed to optimized the desired parameter (e.g., safety, comfort, etc.) Further, such data is stored in sensor data 120 which can be utilized as historical sensor data to be applied to the machine learning process for regenerating or updating the driver signature 121 corresponding to the user ID.

Controlling Automotive Components

When the driver signature is constructed, the vehicle system can thereby determine how a driver would behave on a road. Such predict behavior can therefore be used to pre-emptively (e.g., a few seconds beforehand) control the automotive components in view of the predicted driver behavior.

Figure 5A:
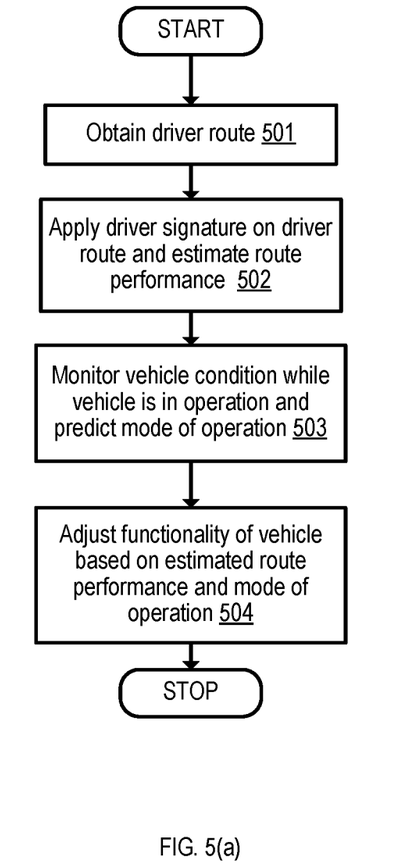
FIGS. 5(a) and 5(b) illustrate example flow diagrams for controlling automotive components process in accordance with an example implementation.

FIG. 5(a) illustrates an example flow diagram for controlling automotive components process in accordance with an example implementation. FIG. 5(a) illustrates an example concept flow for how a component such as a shock absorber will be controlled based on inputs from the machine learning. Based on data collected from OBD(Car), Camera, Accelerometer and GPS, a driver signature will be generated. For future events, the driver signature will provide input into possible actions of the driver. Based on the information of the possible actions, the controller is configured to prepare the car/vehicle for the upcoming event. In an example, the shock absorber will be prepared for turns, acceleration, deceleration, and so on, based on the driver signature, historical information, and the desired implementation.

At 501, the flow is configured to obtain the driver route. Such routes can be obtained from sensor data 120 from the GPS and/or based on an input of a GPS route from a user for navigation. At 502, the flow applies the selected driver signature from FIG. 4 on the driver route and estimates the route performance. Examples of the estimation of the route performance can include predicting the speed of each turn in the route, predicting acceleration for one or more portions of the route, predicting the expected braking G-force, and predicting average speed. In example implementations, the driver signature can be a function configured to determine one or more of the average speed of the turn, the average acceleration, the expected braking G-force and the average speed. The driver signature may also be configured to provide other outputs, in accordance with the desired implementation.

At 503, the flow is configured to monitor the vehicle condition while the vehicle is in operation and predict modes of operation. Depending on the desired implementation, the vehicle can be configured with various modes of operation (e.g., normal driving, sports driving, uphill climbing, etc.)

based on the location of the vehicle and the environment around the vehicle. Such modes can be defined the by vehicle manufacturer in accordance with the desired implementation. At 504, the flow is configured to adjust the functionality of the vehicle based on the estimated route performance and mode of operation. In an example implementation, instructions are transmitted to each of the components via CAN bus from the execution of the driver signature. In an example involving shock absorbers, the flow at 502 can estimate the route performance and pre-load shock settings for the shock absorbers based on the estimated route at 504 (e.g., suspension is stiffened for predicted turns and turn direction). In another example implementation, the flow at 503 can provide dynamic shock settings for the shock absorbers based on the selected vehicle mode, which is implemented into the shock absorbers at 504.

Further, automotive components such as engine, transmission, and so on can be tuned and prepared for the upcoming events based on traffic and ambient conditions. Such implementations can facilitate the car to operate at a higher efficiency due to information on the future driving cycle.

Through the execution of the flow of FIG. 5, the guidelines from the OEM can be utilized to compare the predicted driver actions that are output from the driver signature with ideal driving characteristics. Changes can be pushed to the vehicle controller to modify controls of individual components such as brakes, pedal, engine, maps, and so on, to adjust the efficiency of the vehicle and improve the ride comfort for the driver. The changes to be made can be decided on a remote cloud system or on a vehicle, depending on the desired implementation.

Through example implementations, a smooth vehicle transition system can be generated for a driver. As such, the vehicle ride comfort and efficiency can be made uniform across different vehicle platforms in a fleet or ride sharing program.

Figure 5B:
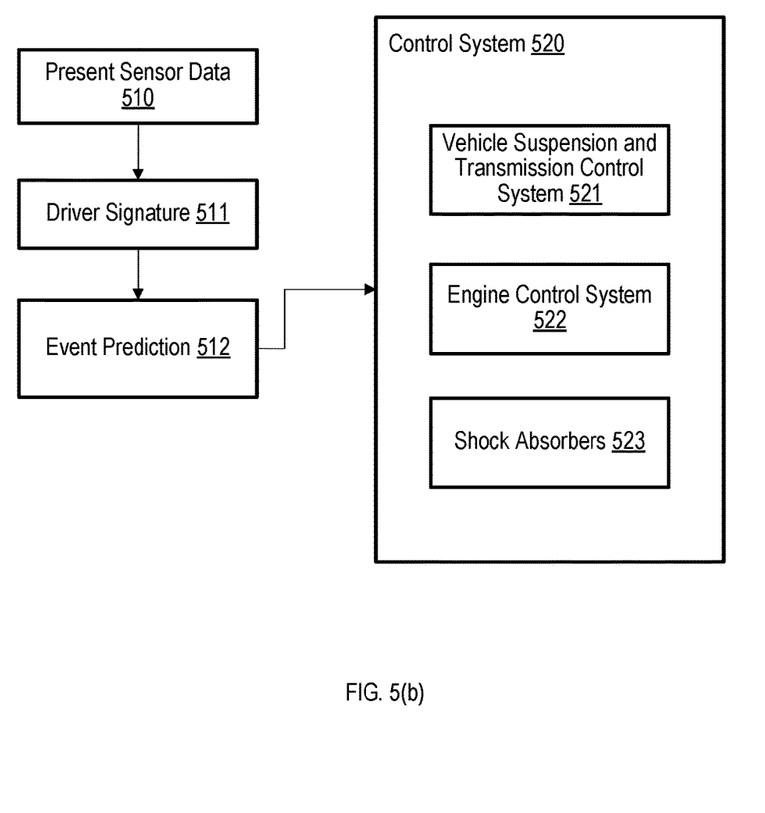

FIG. 5(b) illustrates an example flow for controlling the vehicle, in accordance with an example implementation. In the vehicle system 101, when the vehicle is in operation, present sensor data (e.g., GPS 110, gyroscope 111, accelerometer 112, camera 113) is recorded and stored in the memory of the vehicle system 101 at 510. The sensor data is then provided to the driver signature 121 at 511, wherein the driver signature is configured to predict upcoming driver actions (e.g., in the next x period of time). Such upcoming driver actions can include, but are not limited to turn action (e.g., left, right, how much turn on the steering wheel), stick shift, braking g-force, how much pressure will be applied to the gas pedal, and so on, depending on the desired implementation. Such information is then used to provide event prediction 512 as output. The types of events that can be detected based on the predicted user actions can include, but are not limited to, braking, acceleration, lane changing, cruising (e.g., maintaining course and direction), and so on according to the desired implementation. The event prediction can be provided to the control system 520 of the vehicle, which can be configured to supply parameters/instructions to the vehicle suspension and transmission control system 521, the engine control system 522, and the shock absorbers 523. Other functionality of the vehicle can also be controlled, depending on the desired implementation and the present disclosure is not particularly limited to the examples of FIG. 5(b).

In an example implementation, vehicle suspension and transmission control system 521 can be configured to control the suspension and transmission in view of an upcoming event (e.g., upcoming turn) based on desired OEM parameters. Shock absorbers 523 can be configured to control the shock absorbers in view of an upcoming turn or other event as well. Engine control system, 522 can be configured to engage/disengage brake regeneration processing to save battery, control when the engine takes over the operation of the vehicle versus the battery, and so on depending on the desired implementation. The control system 521 may also be configured to take OEM thresholds into consideration and control the various functionality to ensure that OEM thresholds are not exceeded based on the predicted actions of the driver.

Figure 6:
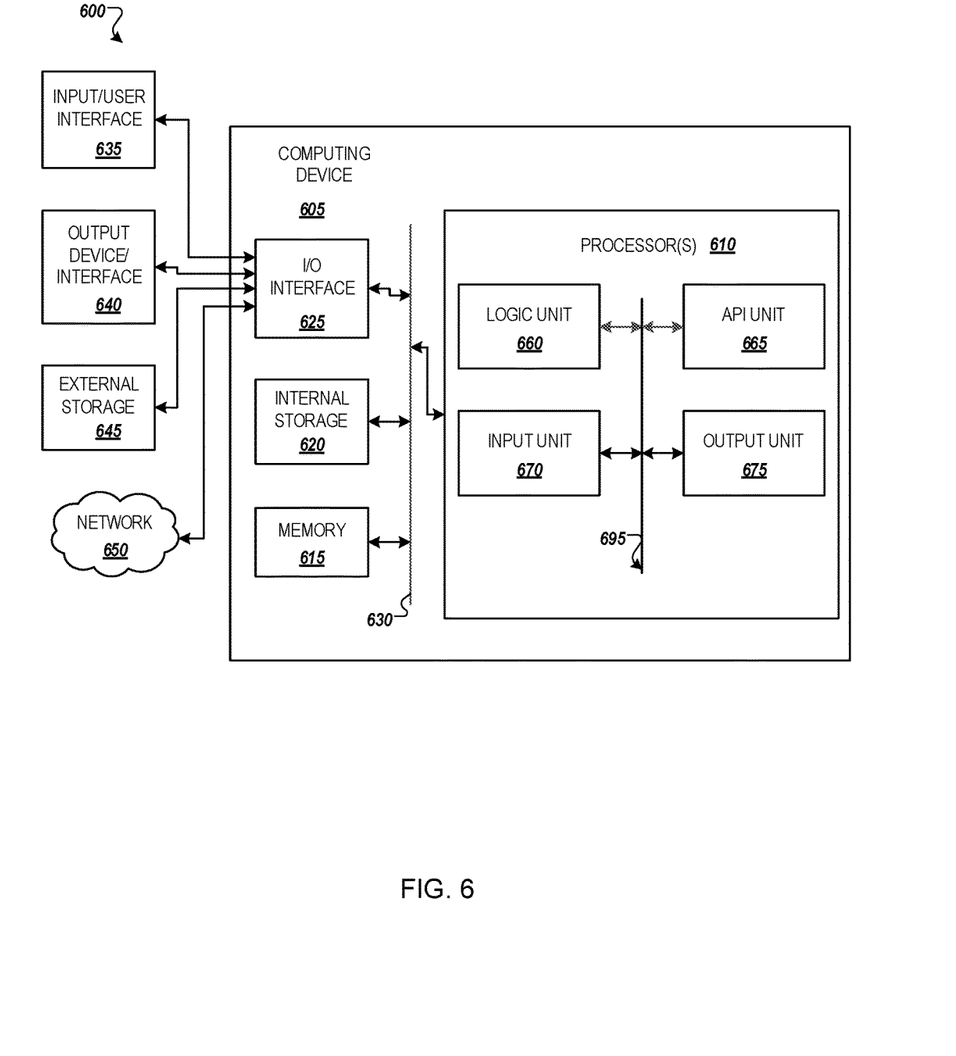
FIG. 6 illustrates an example computing environment with an example computer device suitable for use in some example implementations.

FIG. 6 illustrates an example computing environment with an example computer device suitable for use in some example implementations, such as a management apparatus 102 as illustrated in FIG. 1 and/or vehicle system 101/OBC 114 as illustrated in FIG. 2. All functions described herein can be implemented at the management apparatus 102, at the vehicle system 101, the OBC 114, or facilitate through a system based on some combination of such elements, depending on the desired implementation.

Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Memory 605 can be configured to store sensor data 120 as illustrated in FIG. 3(a) and driver signature 121 as illustrated in FIG. 3(b). Such information may also be stored in database 103, depending on the desired implementation.

Processor(s) 610 can be configured to determine a driver signature for a vehicle, the driver signature configured to predict upcoming driver actions made to the vehicle as illustrated in FIG. 4 and, while the vehicle is in operation, control functionality of the vehicle in anticipation to the upcoming driver actions predicted from the driver signature as illustrated in FIGS. 5(a) and 5(b). As illustrated in FIG. 5(b), such driving actions can involves one or more of braking, acceleration, lane changing, turning and cruising.

Processor(s) 610 may also be configured to construct the driver signature for a driver associated with the vehicle from a machine learning process, the machine learning process configured to process as input, historical sensor information associated with the driver; and generate the driver signature to be configured to process sensor information of the vehicle as input to determine the upcoming driver actions as output as illustrated in FIG. 4.

Processor(s) 610 may also be configured to control the functionality of the vehicle through control of parameters for at least one of vehicle suspension, shock absorbers, and engine control system as illustrated in FIG. 5(b).

To determine the driver signature for the vehicle, processor(s) 610 may be configured to select the driver signature from a plurality of driver signatures as illustrated in FIG. 3(b) based on sensor data of the vehicle received while the vehicle is in operation as described with respect to FIG. 4. In an example implementation, processor(s) 610 may determine the driver signature for the vehicle by being configured to process a driver identifier associated with the driver, and; obtain the driving signature associated with the driver identifier as described with respect to FIG. 4.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A vehicle, comprising:
one or more sensors configured to provide sensor data;
a processor, configured to:
determine a driver signature for a vehicle corresponding to a driver of the vehicle, the driver signature configured to provide a prediction of one or more upcoming driver actions made to the vehicle;
while the vehicle is in operation, control functionality of the vehicle in response to the prediction from the driver signature, wherein different functionality of the vehicle is controlled based on different predicted upcoming drive actions from the driver signature;
wherein, to determine the driver signature for the vehicle corresponding to the driver of the vehicle, the processor is configured to, for the driver having an associated driver signature, select the driver signature from a plurality of driver signatures based on the sensor data of the vehicle received while the vehicle is in operation, wherein each of the plurality of driver signatures is associated with a corresponding driver, wherein the each of the plurality of driver signatures is generated from historical driver data of the corresponding driver.

2. The vehicle of claim 1, wherein the one or more upcoming driving actions comprises at least one of: braking, acceleration, lane changing, turning and cruising.

3. The vehicle of claim 1, wherein the processor is further configured to, for the driver not having an associated driver signature from the plurality of signatures:
construct the driver signature for the driver from a machine learning process, the machine learning process configured to:
process as input, historical sensor information associated with the driver; and
generate the driver signature to be configured to process sensor information of the vehicle as input to determine the upcoming driver actions as output.

4. The vehicle of claim 1, wherein the processor is configured to control the functionality of the vehicle in response to the prediction from the driver signature of the one or more upcoming driver actions made to the vehicle while the vehicle is in operation through control of parameters for at least one of vehicle suspension and transmission, shock absorbers, and engine control system.

5. The vehicle of claim 1, wherein, to determine the driver signature for the vehicle, the processor is configured to:
process a driver identifier associated with the driver, and;
obtain the driver signature associated with the driver identifier.

6. An apparatus, communicatively coupled to one or more vehicles, the apparatus comprising:
a network interface configured to facilitate communications to the one or more vehicles; and
a processor, configured to:
process sensor data from each of the one or more vehicles;
determine a driver signature for a vehicle from the one or more vehicles corresponding to a driver of the vehicle, the driver signature configured to provide a prediction of one or more upcoming driver actions made to the vehicle from the one or more vehicles, wherein different functionality of the vehicle is controlled based on different predicted upcoming drive actions from the driver signature; and
while the vehicle is in operation, provide the driver signature for the vehicle from the one or more vehicles;
wherein, to determine the driver signature for the vehicle, the processor is configured to, for the driver having an associated driver signature, select the driver signature from a plurality of driver signatures based on sensor data of the vehicle received while the vehicle is in operation, wherein each of the plurality of driver signatures is associated with a corresponding driver, wherein the each of the plurality of driver signatures is generated from historical driver data of the corresponding driver.

7. The apparatus of claim 6, wherein the one or more upcoming driving actions comprises at least one of: braking, acceleration, lane changing, turning and cruising.

8. The apparatus of claim 6, wherein the processor is further configured to, for the driver not having an associated driver signature from the plurality of signatures:
construct the driver signature from a machine learning process for the driver, the machine learning process configured to:
process as input, historical sensor information associated with the driver; and
generate the driver signature to be configured to process sensor information of the vehicle from the one or more vehicles as input to determine the upcoming driver actions as output.

9. The apparatus of claim 6, wherein the processor is configured to control the functionality of the vehicle in response to the prediction from the driver signature of the one or more upcoming driver actions made to the vehicle while the vehicle is in operation through control of parameters for at least one of vehicle suspension and transmission, shock absorbers, and engine control system.

10. The apparatus of claim 6, wherein to determine the driver signature for the vehicle from the one or more vehicles, the processor is configured to:
process a driver identifier associated with the driver of the vehicle from the one or more vehicles, and;
obtain the driver signature associated with the driver identifier.

11. A system, comprising:
one or more vehicles configured to provide sensor data; and
an apparatus, communicatively coupled to one or more vehicles, the apparatus comprising:
a network interface configured to facilitate communications to the one or more vehicles; and
a processor, configured to:
process the provided sensor data from each of the one or more vehicles;
determine a driver signature for a vehicle from the one or more vehicles corresponding to a driver of the vehicle, the driver signature configured to provide a prediction of one or more upcoming driver actions made to the vehicle from the one or more vehicle; and
while the vehicle from the one or more vehicles is in operation, provide the driver signature to the vehicle from the one or more vehicles, wherein different functionality of the vehicle is controlled based on different predicted upcoming drive actions from the driver signature;
wherein, to determine the driver signature for the vehicle, the processor is configured to, for the driver of the vehicle having an associated driver signature, select the driver signature from a plurality of driver signatures based on sensor data of the vehicle received while the vehicle is in operation, wherein each of the plurality of driver signatures is associated with a corresponding driver, wherein the each of the plurality of driver signatures is generated from historical driver data of the corresponding driver.

12. The system of claim 11, wherein the one or more upcoming driving actions comprises at least one of: braking, acceleration, lane changing, turning and cruising.

13. The system of claim 11, wherein the processor is further configured to, for the driver not having an associated driver signature from the plurality of signatures:
construct the driver signature for the driver from a machine learning process, the machine learning process configured to:
process as input, historical trip information associated with the driver and historical sensor information associated with the driver;
generate the driver signature to be configured to process sensor information of the vehicle as input to determine the upcoming driver actions as output.

14. The system of claim 11, wherein the processor is configured to control the functionality of the vehicle in response to the prediction from the driver signature of the one or more upcoming driver actions made to the vehicle while the vehicle is in operation through control of parameters for at least one of vehicle suspension and transmission, shock absorbers, and engine control system.

15. The system of claim 11, wherein to determine the driver signature for the vehicle from the one or more vehicles, the processor is configured to:
process a driver identifier associated with the driver of the vehicle from the one or more vehicles, and;
obtain the driver signature associated with the driver identifier.

16. The system of claim 11, wherein each of the one or more vehicles configured to construct the driver signature for the driver from a machine learning process, the machine learning process configured to:
process as input, historical trip information associated with the driver and historical sensor information associated with the driver;
generate the driver signature to be configured to process sensor information of the vehicle as input to determine the upcoming driver actions as output.

* * * * *